US010542658B2

(12) United States Patent
Knobloch

(10) Patent No.: US 10,542,658 B2
(45) Date of Patent: Jan. 28, 2020

(54) SYSTEM FOR ADJUSTING DOWN PRESSURE LOADS ON GROUND ENGAGING ELEMENTS OF AN AGRICULTURAL IMPLEMENT

(71) Applicant: CNH Industrial America, LLC, New Holland, PA (US)

(72) Inventor: Dean A. Knobloch, Tuscon, AR (US)

(73) Assignee: CNH Industrial America LLC, New Holland, PA (US)

( * ) Notice: Subject to any disclaimer, the term of this patent is extended or adjusted under 35 U.S.C. 154(b) by 125 days.

(21) Appl. No.: 15/344,648

(22) Filed: Nov. 7, 2016

(65) Prior Publication Data

US 2018/0124991 A1 May 10, 2018

(51) Int. Cl.
*A01B 63/28* (2006.01)
(52) U.S. Cl.
CPC .................. *A01B 63/28* (2013.01)
(58) Field of Classification Search
CPC ..... A01B 63/008; A01B 63/32; A01B 61/044; A01B 19/00; A01B 19/02; A01B 19/04; A01B 19/06; A01B 19/10; A01B 49/02; A01B 23/04; A01B 23/043
See application file for complete search history.

(56) References Cited

U.S. PATENT DOCUMENTS

| | | | | | |
|---|---|---|---|---|---|
| 2,947,371 A | * | 8/1960 | Rice | ........................ | A01B 19/10 172/393 |
| 3,500,936 A | * | 3/1970 | Vigen | ..................... | A01B 35/22 172/198 |
| 3,584,693 A | * | 6/1971 | Bobrowski | ............ | A01B 19/02 172/442 |
| 3,765,159 A | * | 10/1973 | Neff | ........................ | A01B 45/00 172/622 |
| 3,774,694 A | * | 11/1973 | Gates | .................... | A01B 23/043 172/617 |
| 4,127,341 A | * | 11/1978 | Stevens | ................ | A01B 61/046 172/178 |

(Continued)

FOREIGN PATENT DOCUMENTS

| | | |
|---|---|---|
| CA | 2267707 | 9/2000 |
| EP | 0086356 | 1/1983 |
| JP | 2001148913 | 6/2001 |

*Primary Examiner* — Jamie L McGowan
(74) *Attorney, Agent, or Firm* — Rebecca L. Henkel; Rickard K. DeMille

(57) ABSTRACT

A system for adjusting down pressure loads on a harrow of an agricultural implement may include a base hitch member and an upper tow arm pivotally coupled to the base hitch member. First and second linkage arms may pivotally couple to the upper tow arm. A lower support arm may pivotally couple to the first and second linkage arms. A plurality of ground engaging elements may be supported on the lower support arm. A tensioner assembly may include an actuator coupled between the base hitch member and the lower support arm. The actuator may include an actuator rod that extend and retract to adjust a relative distance between the base hitch member and the lower support arm. The actuator may regulate a down pressure applied on the plurality of ground engaging elements by adjusting the relative distance between the base hitch member and the lower support arm.

16 Claims, 8 Drawing Sheets

(56) References Cited

U.S. PATENT DOCUMENTS

| | | | | |
|---|---|---|---|---|
| 4,220,211 | A * | 9/1980 | Hake | A01B 19/02 172/198 |
| 4,342,366 | A * | 8/1982 | Schenk | A01B 23/02 172/198 |
| 4,561,504 | A * | 12/1985 | Andersen | A01B 23/046 172/142 |
| 4,600,060 | A * | 7/1986 | Winter | A01B 63/32 172/4 |
| 5,042,589 | A * | 8/1991 | Hundeby | A01B 63/22 172/310 |
| 5,168,936 | A * | 12/1992 | Stevens | A01B 23/043 172/198 |
| 5,492,182 | A * | 2/1996 | Delaurier | A01B 19/02 172/615 |
| 5,622,229 | A * | 4/1997 | Degelman | A01B 23/043 172/311 |
| 5,833,011 | A * | 11/1998 | Boertlein | A01B 49/027 172/149 |
| 6,164,386 | A * | 12/2000 | Delaurier | A01B 19/02 172/615 |
| 6,626,246 | B2 * | 9/2003 | Gerber | A01B 19/02 172/142 |
| 6,896,068 | B2 * | 5/2005 | Dietrich, Sr. | A01B 49/027 172/142 |
| 6,926,093 | B1 * | 8/2005 | Fink | A01B 63/26 172/261 |
| 6,948,568 | B2 | 9/2005 | Banks | |
| 7,766,093 | B2 * | 8/2010 | Becker | A01B 63/32 172/133 |
| 7,980,186 | B2 | 7/2011 | Henry | |
| 7,980,318 | B1 * | 7/2011 | Waldo | A01B 61/046 172/140 |
| 8,550,020 | B2 * | 10/2013 | Sauder | F15B 11/042 111/195 |
| 8,657,026 | B2 * | 2/2014 | Friesen | A01B 63/32 172/452 |
| 2002/0084083 | A1 * | 7/2002 | Nelson | A01B 25/00 172/624.5 |
| 2003/0132013 | A1 * | 7/2003 | Steinlage | A01B 23/043 172/705 |
| 2012/0211247 | A1 | 8/2012 | Lorenz | |
| 2014/0048297 | A1 * | 2/2014 | Bassett | A01B 63/114 172/4 |
| 2014/0251646 | A1 * | 9/2014 | Gray | A01B 61/044 172/1 |
| 2014/0251647 | A1 * | 9/2014 | Isaacson | A01C 7/205 172/2 |
| 2016/0073571 | A1 * | 3/2016 | Hurd | A01B 35/16 172/1 |
| 2016/0234994 | A1 * | 8/2016 | Gray | A01B 63/24 |
| 2017/0079190 | A1 * | 3/2017 | Steinlage | A01B 61/046 |
| 2017/0079197 | A1 * | 3/2017 | Steinlage | A01B 73/044 |
| 2017/0112043 | A1 * | 4/2017 | Nair | A01B 63/002 |
| 2017/0311532 | A1 * | 11/2017 | Hurd | A01B 49/02 |
| 2018/0077847 | A1 * | 3/2018 | Kirchhoff | A01B 39/08 |
| 2018/0116095 | A1 * | 5/2018 | Knobloch | A01B 49/027 |
| 2018/0139883 | A1 * | 5/2018 | Lung | A01B 19/10 |

* cited by examiner

SYSTEM FOR ADJUSTING DOWN PRESSURE LOADS ON GROUND ENGAGING ELEMENTS OF AN AGRICULTURAL IMPLEMENT

FIELD OF THE INVENTION

The present subject matter relates generally to agricultural implements and, more particularly, to improved systems for adjusting down pressure loads acting on ground engaging elements of a harrow of an agricultural implement.

BACKGROUND OF THE INVENTION

A wide variety of agricultural implements may be used to prepare soil for planting. One such implement is a harrow. As is generally known, harrows may be configured to be towed behind a work vehicle, such as tractor, to level soil after it has been tilled by, e.g., a cultivator. Level soil promotes uniform planting depth and uniform germination. More specifically, harrows typically include a plurality of ground engaging elements, such as tines or spikes, that extend downward from a frame of the harrow. These ground engaging elements may be configured to penetrate the soil to a particular depth. The amount of down pressure exerted on the ground engaging elements control the depth of soil penetration.

Excessively high or low down pressure on the ground engaging elements may hinder the operation of the harrow. For instance, soil and/or debris may build up in front of the ground engaging elements as the harrow is towed by the work vehicle. This buildup may undesirably decrease the down pressure on the ground engaging elements. Excessively low down pressure may prevent the ground engaging elements from penetrating the soil to a sufficient depth, thereby hindering the leveling process. Conversely, towing the harrow at high rate of speed may undesirably increase the down pressure on the ground engaging elements. In such instances, the ground engaging elements may hop, skip, or otherwise disengage from the soil, thereby leaving areas of the soil that have not been leveled. Furthermore, hopping and skipping may cause unnecessary wear and/or damage to the ground engaging elements and/or other components of the harrow.

Accordingly, an improved system for adjusting down pressure loads on the ground engaging elements of a harrow of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for adjusting down pressure loads on a harrow of an agricultural implement. The system may include a base hitch member and an upper tow arm pivotally coupled to the base hitch member. The system may also include first and second linkage arms pivotally coupled to the upper tow arm and a lower support arm pivotally coupled to the first and second linkage arms. A plurality of ground engaging elements may be supported on the lower support arm. Additionally, the system may include a tensioner assembly having an actuator coupled between the base hitch member and the lower support arm. The actuator may include an actuator rod configured to be extended and retracted to adjust a relative distance between the base hitch member and the lower support arm. The actuator may be configured to regulate a down pressure applied on the plurality of ground engaging elements by adjusting the relative distance between the base hitch member and the lower support arm.

In another aspect, the present subject matter is directed to a system for adjusting down pressure loads on a harrow of an agricultural implement. The system may include a base hitch member and a support arm configured to move relative to the base hitch member. The system may also include a plurality of ground engaging elements supported on the support arm. Additionally, the system may include a tensioner assembly coupled between the base hitch member and the support arm. The tensioner assembly may include an actuator and a compressible member. The actuator may include an actuator rod configured to be extended and retracted to adjust a relative distance between the base hitch member and the lower support arm. The compressible member may be coupled between the actuator rod and one of the base hitch member or the lower support member. The actuator may be configured to regulate a down pressure applied on the plurality of ground engaging elements by adjusting the relative distance between the base hitch member and the lower support arm.

In a further aspect, the present subject matter is directed to a system for adjusting down pressure loads on a harrow of an agricultural implement. The system may include a base hitch member and a support arm configured to move relative to the base hitch member. The system may also include a plurality of ground engaging elements supported on the support arm. Additionally, the system may include a tensioner assembly having an actuator coupled between the base hitch member and the lower support arm. The actuator may include an actuator rod configured to be extended and retracted to adjust a relative distance between the base hitch member and the lower support arm. The system may include a sensor configured to detect an operating parameter associated with a down pressure being applied on the plurality of ground engaging elements. The system may further include a controller communicatively coupled to the sensor. The controller may be configured to control an operation of the actuator based on measurement signals received from the sensor to adjust the relative distance between the base hitch member and the lower support arm so as to regulate the down pressure applied on the plurality of ground engaging elements.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
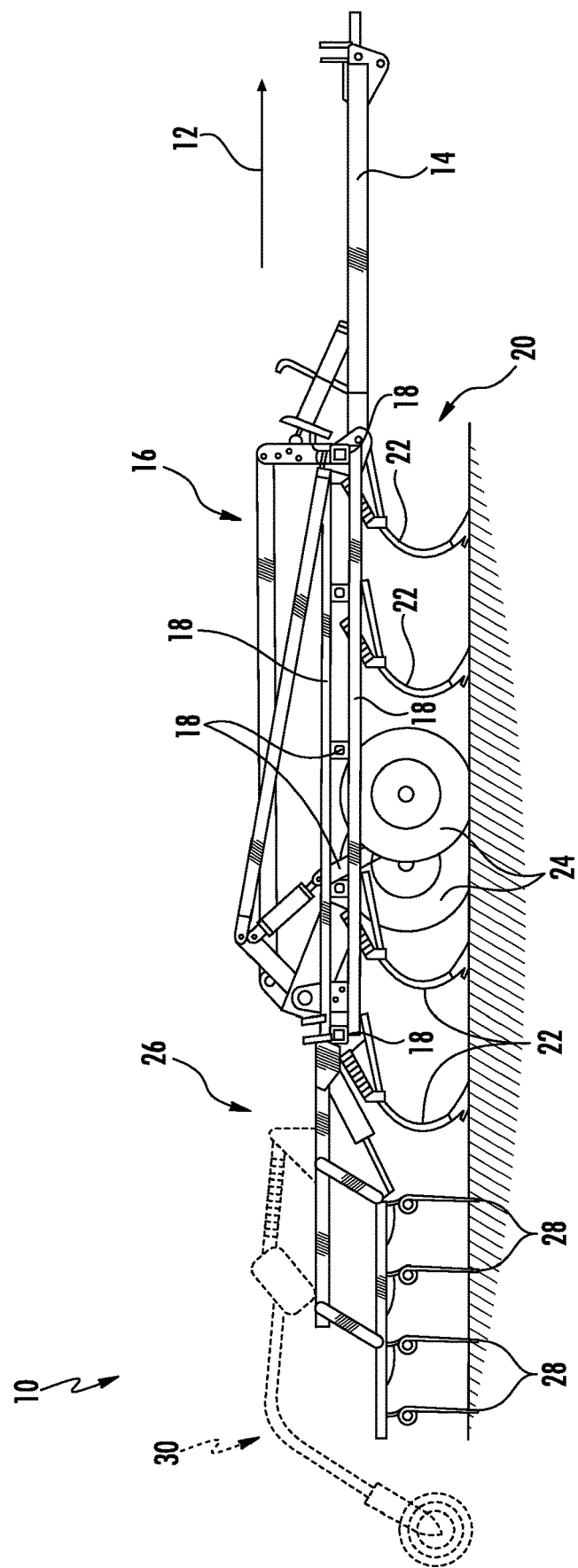
FIG. 1 illustrates a side view of one embodiment of an agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for adjusting down pressure loads on ground engaging elements of a harrow of an agricultural implement. Specifically, in several embodiments, the disclosed system may monitor the down pressure on the ground engaging elements of the harrow relative to a predetermined range to determine when the down pressure exceeds or drops below such operating range. For instance, the down pressure may fall outside the predetermined range due to the accumulation of material in front of the ground engaging elements or due to the speed at which the harrow is being towed by a work vehicle. Upon determining that the down pressure load is outside of the predetermined range, a controller of the work vehicle or implement may be configured to regulate the down pressure loads on the ground engaging elements to return the down pressure to the desired operating range.

In accordance with aspects of the present subject matter, the down pressure may be adjusted using an actuator. Specifically, in several embodiments, the actuator may be coupled between a base hitch plate and a lower support arm of the harrow. In such embodiments, the actuator may be configured to adjust the relative distance between the base hitch plate and the lower support arm. The relative distance may, in turn, be indicative of or may otherwise be related to the down pressure loads acting on the ground engaging elements.

In several embodiments, the controller may be configured to control the operation of the actuator to actively regulate the down pressure on the ground engaging elements. Specifically, by monitoring an operating parameter associated with the down pressure on the ground engaging elements, the controller may be configured to detect undesirably high or low levels of down pressure being applied on the ground engaging elements, which could result in damage to the harrow components and/or inefficient operation of the harrow. When such undesirable levels of down pressure are detected, the controller may be configured to control the actuator to return the down pressure to the desired level. For instance, the controller may be configured to control the actuator to adjust the relative distance between the base hitch plate and the lower support arm of the harrow to adjust the current down pressure being applied on the ground engaging elements.

Referring now to FIG. 1, a side view of one embodiment of an agricultural implement 10 is illustrated in accordance with aspects of the present subject matter. As shown, the implement 10 may be configured to be towed along a direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

In general, the implement frame 16 may include a plurality of structural frame members 18, such as beams, bars, and/or the like, configured to support a plurality of components. For instance, as shown in the illustrated embodiment, the frame 16 may be configured to support a cultivator 20, which may be configured to till or otherwise break the soil over which the implement 10 travels. In this respect, the cultivator 20 may include a plurality of cultivator members 22, such as the illustrated shank assemblies, that are pulled through the soil as the implement 10 moves in the direction of travel 12. As shown, the cultivator members 22 may be configured to be pivotally mounted to the implement frame 16 to allow the cultivator members 22 pivot out of the way of rocks or other impediments in the soil. Additionally, a pair of wheels 24 may be coupled to the implement frame 16 that support the weight of the frame 16 and the cultivator 20, thereby enabling the implement 10 to be towed across the field.

Moreover, as shown in FIG. 1, the implement 10 may also include a harrow 26. As is generally understood, the harrow 26 may be configured to be pivotally coupled to the implement frame 16. The harrow 26 may include a plurality of ground engaging elements 28, such as tines or spikes, that are configured to level or otherwise flatten any windrows or ridges in the soil created by the cultivator 20. Specifically, the ground engaging elements 28 may be configured to be pulled through the soil as the implement 10 moves in the direction of travel 12. As will be described below, a down pressure may be exerted on the ground engaging elements 28, which controls the depth to which the ground engaging elements 28 penetrate the soil.

Although not shown, it should be appreciated that, in certain embodiments, the harrow 26 may include a plurality of harrow sections. In such embodiments, the harrow sections may be configured to be independently pivotable relative to the implement frame 16. Alternatively, the harrow sections may pivot in unison relative to the implement frame 16.

Moreover, in one embodiment, the implement 10 may optionally include a basket or rotary firming wheel 30. As is generally understood, the basket 30 may be configured to reduce the number of clods in the soil and/or firm the soil over which the implement 10 travels. As shown, the basket 30 may be configured to be pivotally coupled to the harrow 26. Alternately, the basket 30 may be configured to be pivotally coupled to the implement frame 16 or any other suitable location of the implement 10.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2:
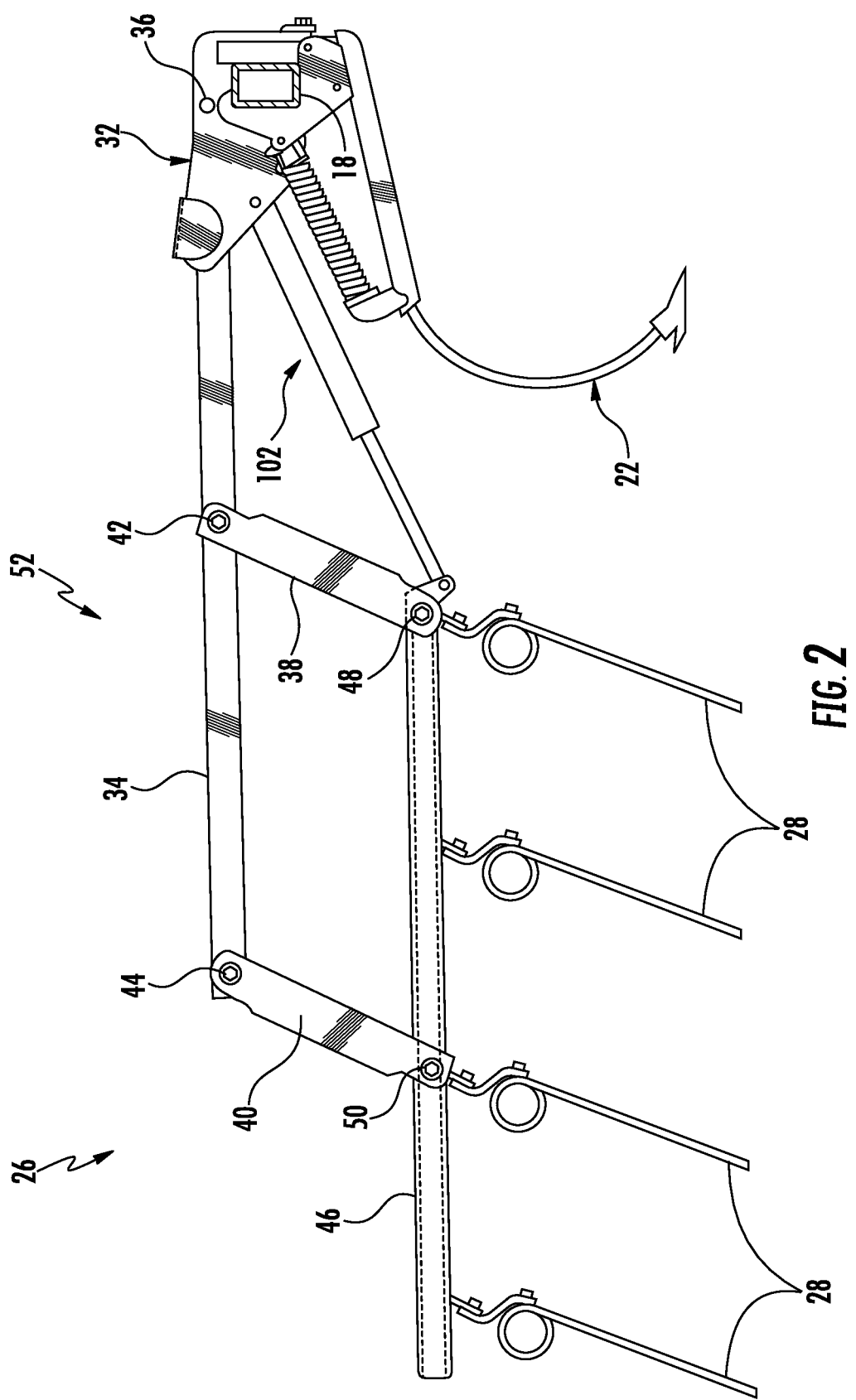
FIG. 2 illustrates a side view of one embodiment of a harrow suitable for use with the agricultural implement shown in FIG. 1 in accordance with aspects of the present subject matter.

Referring now to FIG. 2, a side view of an exemplary embodiment of the harrow 26 shown in FIG. 1 is illustrated in accordance with aspects of the present subject matter. As shown, the harrow 26 may include a base hitch member 32 rigidly coupled to one of the frame members 18 of the implement frame 16. An upper tow arm 34 may be pivotally coupled to the base hitch member 32 at a pivot joint 36. First and second linkage arms 38, 40 may be pivotally coupled to the upper tow arm 34 at pivot joints 42, 44. Additionally, a lower support arm 46 may be pivotally coupled to the first and second linkage arms 42, 44 at pivot joints 48, 50. The ground engaging elements 28, such as the illustrated tines, may be supported on the lower support arm 46. As is generally understand, the lower support arm 46 may be configured to support a plurality of rows of ground engaging elements 28.

As shown in FIG. 2, the upper tow arm 34, the first and second linkage arms 38, 40, and the lower support arm 46 may collectively form a four bar linkage 52, such as the illustrated parallelogram-shaped four-bar linkage. The four bar linkage 52 may be configured to allow the lower support arm 46 to move relative to the base hitch member 32 in the desired manner. More specifically, the upper tow arm 34 and the lower support arm 46 may generally be configured to be oriented in a parallel relationship. Similarly, the first and second linkage arms 38, 40 may generally be configured to be oriented in a parallel relationship. In this respect, the first and second linkage arms 38, 40 may allow the lower support arm 46 to pivot relative to the upper tow arm 34. As such, the lower support arm 46 may move toward and away from the base hitch member 32. Furthermore, the upper tow arm 34 and the lower support arm 46 may pivot relative to the base hitch member 32 to allow the ground engaging elements to move out of the way of rocks or other impediments in the soil. In alternate embodiments, the four-bar linkage 52 may have any other suitable configuration that permits relative movement between the base hitch member 32 and the lower support arm 46.

Additionally, the harrow 26 may also include a tensioner assembly 102 coupled between the base hitch member 32 and the lower support arm 46. As will be described below, the tensioner assembly 102 may be utilized to adjust the down pressure loads on the ground engaging elements 28 of the harrow 26.

Figure 3:
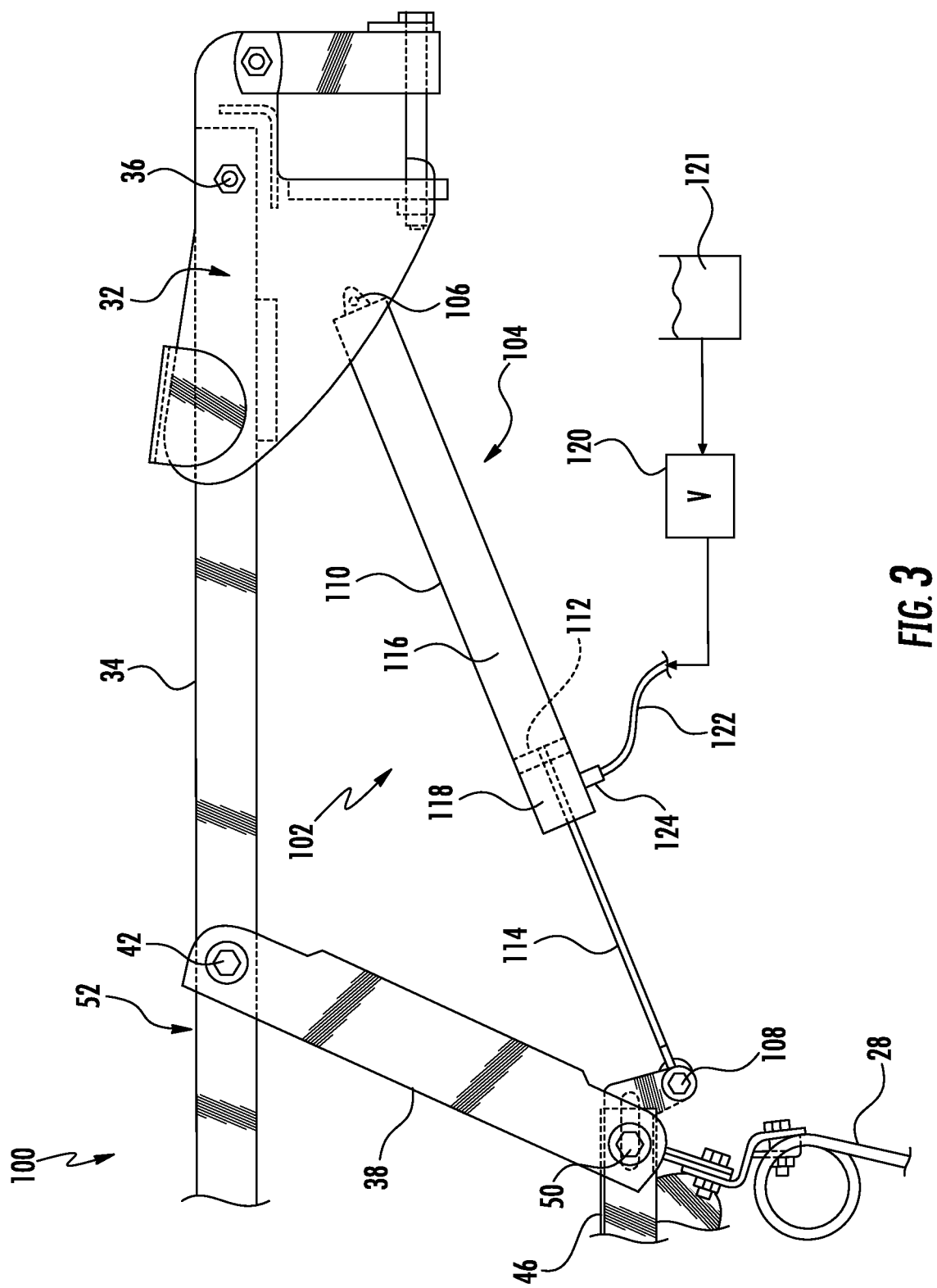
FIG. 3 illustrates a side view of one embodiment of a system for adjusting down pressure loads on ground engaging elements of a harrow in accordance with aspects of the present subject matter, particularly illustrating the system including an actuator for adjusting the down pressure loads.

Referring now to FIG. 3, a side view of one embodiment of a system 100 for adjusting down pressure loads on the ground engaging elements of a harrow of an agricultural implement is illustrated in accordance with aspects of the present subject matter. In general, the system 100 will be described herein with reference to the agricultural implement 10 and the harrow 26 described above with reference to FIGS. 1-2. However, it should be appreciated by those of ordinary skill in the art that the disclosed system 100 may generally be utilized with harrows 26 having any other suitable harrow configuration and/or implements 10 having any other suitable implement configuration.

As shown, the system 100 may generally include a tensioner assembly 102 coupled between the base hitch member 32 and the lower support arm 46. In general, the tensioner assembly 102 may be configured to regulate the down pressure applied on the ground engaging elements 28. As shown in FIG. 3, the tensioner assembly 102 may include a fluid-driven actuator 104 coupled to the base hitch member 32 and the lower support arm 46 at pivot joints 106, 108, respectively. In particular, the pivot joints 106, 108 may allow relative pivotable movement between the actuator 104, the base hitch member 32, and the lower support arm 46.

It should be appreciated that the actuator 104 may generally correspond to any suitable fluid-driven actuator known in the art, such as a hydraulic actuator and/or a pneumatic actuator. Thus, in several embodiments, the actuator 104 may include both a cylinder 110 configured to house a piston 112 and a rod 114 coupled to the piston 112 that extends outwardly from the cylinder 110. Additionally, the actuator 104 may include a piston-side chamber 116 and a rod-side chamber 118 defined within the cylinder 110. As is generally, understood, by regulating the pressure of the fluid supplied to one or both of the cylinder chambers, the actuation of the rod 114 may be controlled. As shown in FIG. 3, in the illustrated embodiment, the end of the rod 114 is coupled to the lower support arm 46 at pivot joint 108 while the cylinder 110 is coupled to the base hitch member 32 at the opposed pivot joint 106. However, in an alternative embodiment, the end of the rod 114 may be coupled to the base hitch member 32 at pivot joint 106 while the cylinder is coupled to the lower support arm 46 at pivot joint 108.

In several embodiments, the system 100 may also include a suitable pressure regulating valve 120 (PRV) (e.g., a solenoid-activated valve or a manually operated valve) configured to regulate a supply of fluid (e.g., hydraulic fluid or air from a suitable fluid source or tank 121) being supplied to the actuator 104. As shown in FIG. 3, in one embodiment, the PRV 120 may be in fluid communication with the rod-side chamber 118 of the actuator 104. In this respect, the system 100 may include a fluid conduit 122, such as the illustrated hose, that fluidly couples the PRV 120 to a fitting 124 on the cylinder 110. As such, the PRV 120 may regulate the supply fluid to the rod-side chamber 118. It should be appreciated that, in alternate embodiments, the PRV 120 may be in fluid communication with the piston-side chamber 116 to regulate the supply fluid thereto. Alternatively, the system 100 may include a pair of PRVs 120, with each PRV 120 being in fluid communication with one of the chambers 116, 118 of the actuator 104.

The tensioner assembly 102 may be configured to adjust the down pressure loads on the ground engaging elements 28 by allowing the relative distance between the base hitch member 32 and the lower support arm 46 to be adjusted. More specifically, the actuator 104 may be configured to adjust the down pressure loads based on the pressure of the fluid supplied to and/or within the actuator 104. For instance, by increasing the fluid pressure supplied within the rod-side chamber 118 of the actuator 104, the actuator rod 114 may be retracted in a manner that results in the lower support arm 46 pivoting toward the base hitch member 32, thereby increasing the down pressure loads on the ground engaging elements 28. Similarly, by decreasing the fluid pressure supplied within the rod-side chamber 118 of the actuator 104, the actuator rod 114 may be extended in a manner that results in the lower support arm 46 pivoting away from the base hitch member 32, thereby decreasing the down pressure loads on the ground engaging elements 28. As will be discussed below, in some embodiments, the system 100 may include a controller configured to electronically control the operation of the actuator 104, thereby allowing the down pressure loads on the ground engaging elements 28 to be automatically regulated by the controller.

In several embodiments, the actuator 104 may be configured to be pressurized at a predetermined pressure to set the relative distance between the base hitch member 32 and the lower support arm 46 (and, thus, to set the desired down pressure on the ground engaging elements 28). More specifically, in one embodiment, the PRV 120 may be configured to supply fluid to the actuator 104 (e.g., within the rod-side chamber 118) at a predetermined fluid pressure. As the implement 10 moves in the direction of travel 12, the ground engaging elements 28 may be engaged with the soil such that an outward force in a direction opposite the direction of travel 12 may be transferred to the actuator 104 from the ground engaging elements 28 and the lower support arm 46. In the event that this outward force exceeds the force being applied on the piston 112 via the pressurized fluid (e.g., in the event the ground engaging elements 28 contact a rock or other impediment or when the down pressure otherwise increases beyond a given threshold), the actuator rod 114 may extend outwardly to allow the lower support arm 46 to move/pivot away from the base hitch member 32, thereby reducing the down pressure applied on the ground engaging elements 28. As such, the ground engaging elements 28 of the harrow 26 may be able to traverse rocks and other impediments in the soil without incurring unnecessary wear or damage. It should be appreciated that the predetermined pressure at which the fluid is supplied to the actuator 104 may be selected based on the desired soil penetration depth for the ground engaging elements 28. In addition, it should be appreciated that the predetermined fluid pressure may be set manually by an operator of the associated work vehicle or may be selected automatically by an associated controller of the disclosed system 100.

Figure 4:
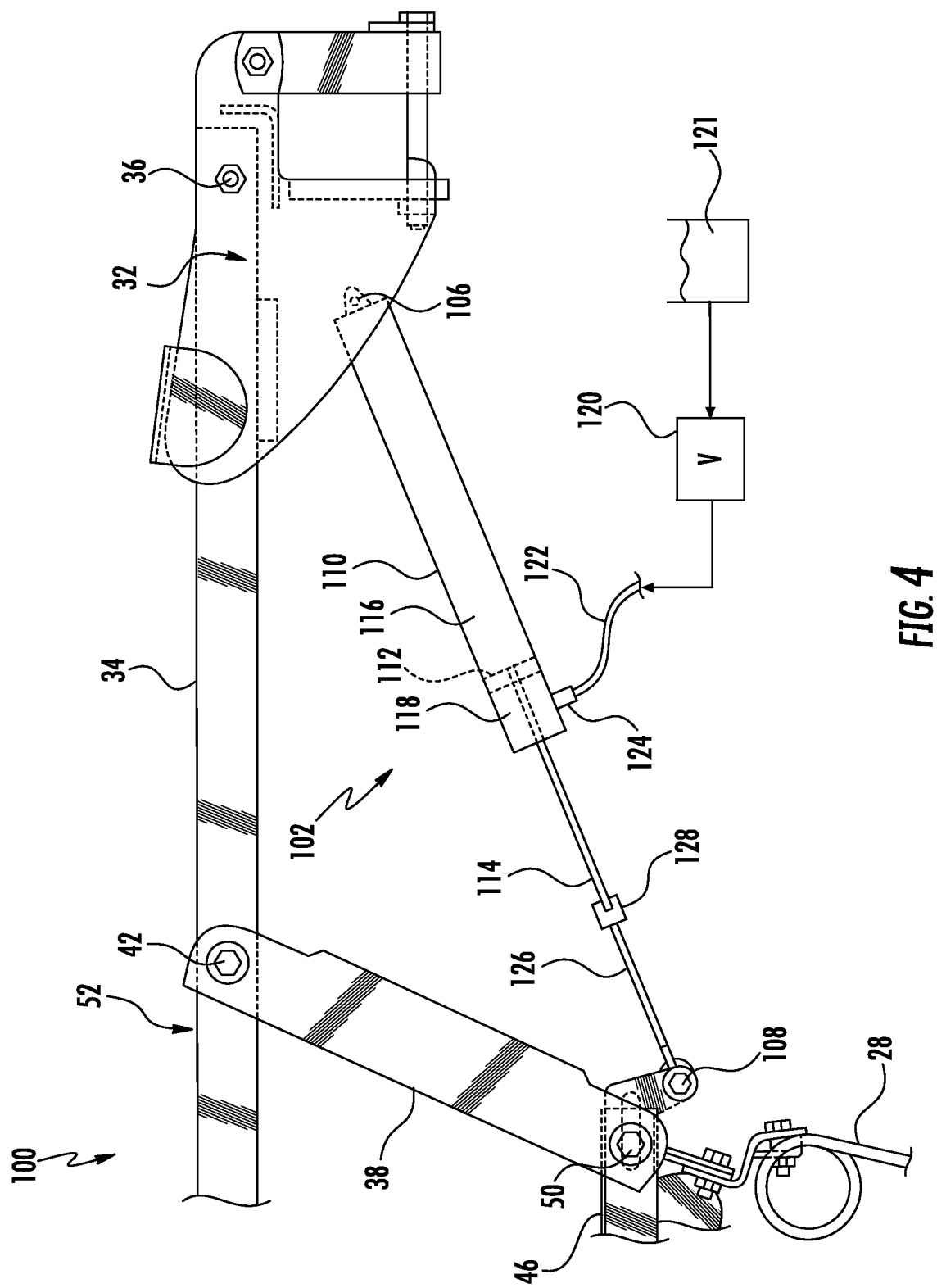
FIG. 4 illustrates a side view of another embodiment of a system for adjusting down pressure loads on ground engaging elements of a harrow in accordance with aspects of the present subject matter, particularly illustrating the system including an actuator/linkage combination for adjusting the down pressure loads.

Referring now to FIG. 4, a side view of another embodiment of the system 100 described above with reference to FIG. 3 is illustrated in accordance with aspects of the present subject matter. As shown, the system 100 may generally be configured the same as or similar to that described above with reference to FIG. 3. For instance, the system 100 may include a tensioner assembly 102 coupled between the base hitch member 32 and the lower support arm 46, with the tensioner assembly 102 including the above-described actuator 104 for adjusting the relative distance defined between the base hitch member 32 and the lower support arm 46. However, as shown in FIG. 4, unlike the above-described embodiment, the tensioner assembly 102 may also include a mechanical linkage bar 126 coupled between the actuator 104 and the lower support arm 46. Specifically, in one embodiment, the linkage bar 126 may be coupled to the rod 114 at a first joint 128 and to the lower support arm 46 at the pivot joint 108. In this respect, the linkage bar 126 may transmit force between the actuator 104 and the lower support arm 46. It should be appreciated that, in alternate embodiments, the linkage bar 126 may be coupled between the actuator 104 and the base hitch plate 32.

Figure 5:
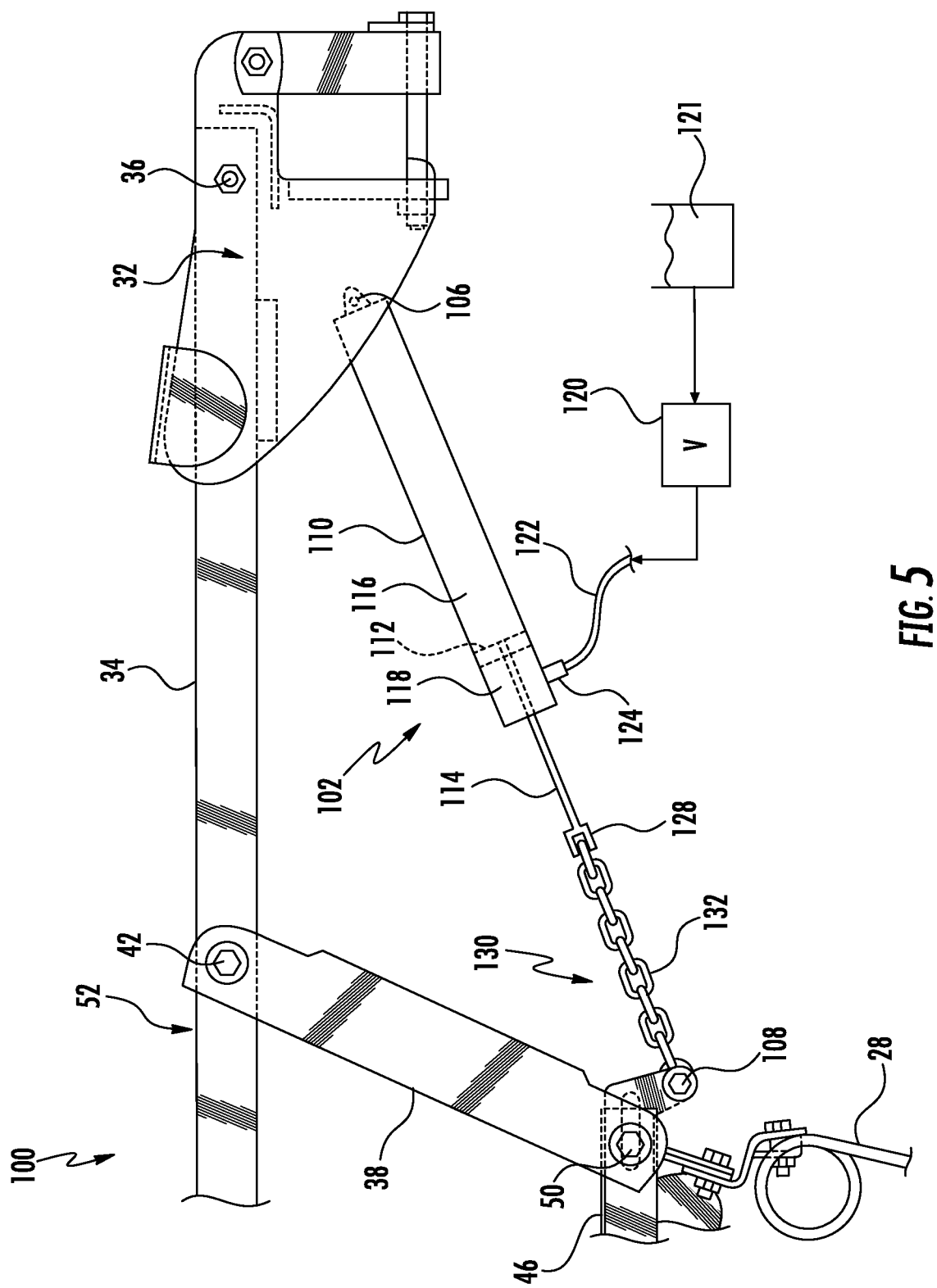
FIG. 5 illustrates a side view of a further embodiment of a system for adjusting down pressure loads on ground engaging elements of a harrow in accordance with aspects of the present subject matter, particularly illustrating the system including an actuator/chain combination for adjusting the down pressure loads.
Figure 6:
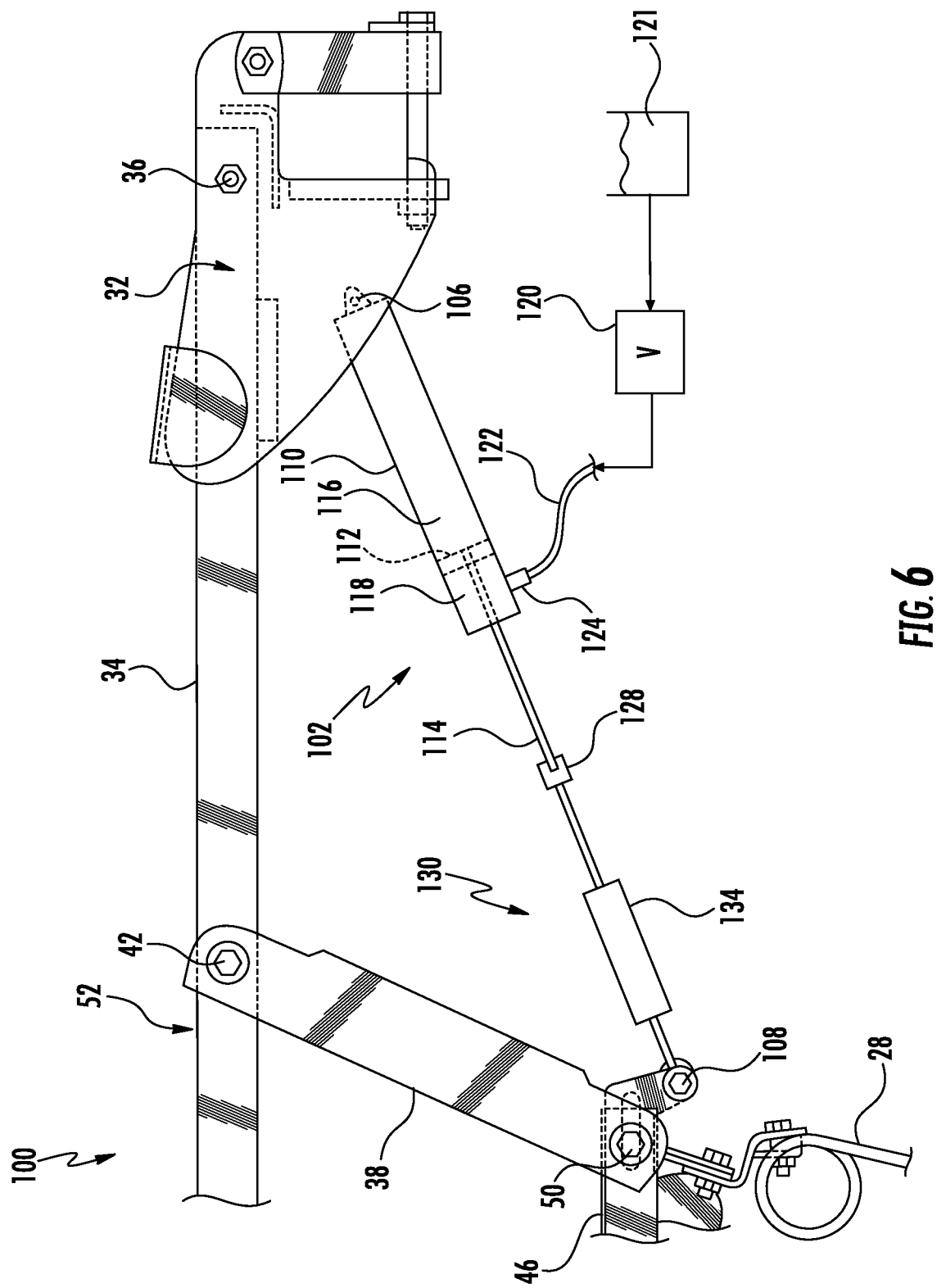
FIG. 6 illustrates a side view of yet another embodiment of a system for adjusting down pressure loads on ground engaging elements of a harrow in accordance with aspects of the present subject matter, particularly illustrating the system including an actuator/damper combination for adjusting the down pressure loads.

Referring now to FIGS. 5 and 6, side views of further embodiments of the system 100 described above with reference to FIG. 3 are illustrated in accordance with aspects of the present subject matter. As shown in FIGS. 5 and 6, the system 100 may generally be configured the same as or similar to that described above with reference to FIG. 3. For instance, the system 100 may include a tensioner assembly 102 coupled between the base hitch member 32 and the lower support arm 46, with the tensioner assembly 102 including the above-described actuator 104 for adjusting the relative distance defined between the base hitch member 32 and the lower support arm 46. However, as shown in FIGS. 5 and 6, unlike the above-described embodiments, the tensioner assembly 102 may also include a compressible member 130 coupled between the actuator 104 and the lower support arm 46. In particular, the compressible member 130 may be coupled to the rod 114 at a first joint 128 and to the lower support arm 46 at the pivot joint 108. In this respect, the compressible member 130 may transmit and/or absorb force between the actuator 104 and the lower support arm 46. In the embodiment shown in FIG. 5, the compressible member 130 corresponds to a chain 132, such as a link chain. Alternately, as shown in FIG. 6, the compressible member 130 may correspond to a damper 134, such as an air cylinder or other suitable damping device. However, it should be appreciated that, in other embodiments, the compressible member 130 may correspond to any other suitable compressible member that may be configured to transmit and/or absorb force between the actuator 104 and the lower support arm 46. Furthermore, it should be appreciated that, in an alternate embodiment, the compressible member 130 may be coupled between the actuator 104 and the base hitch plate 32.

Figure 7:
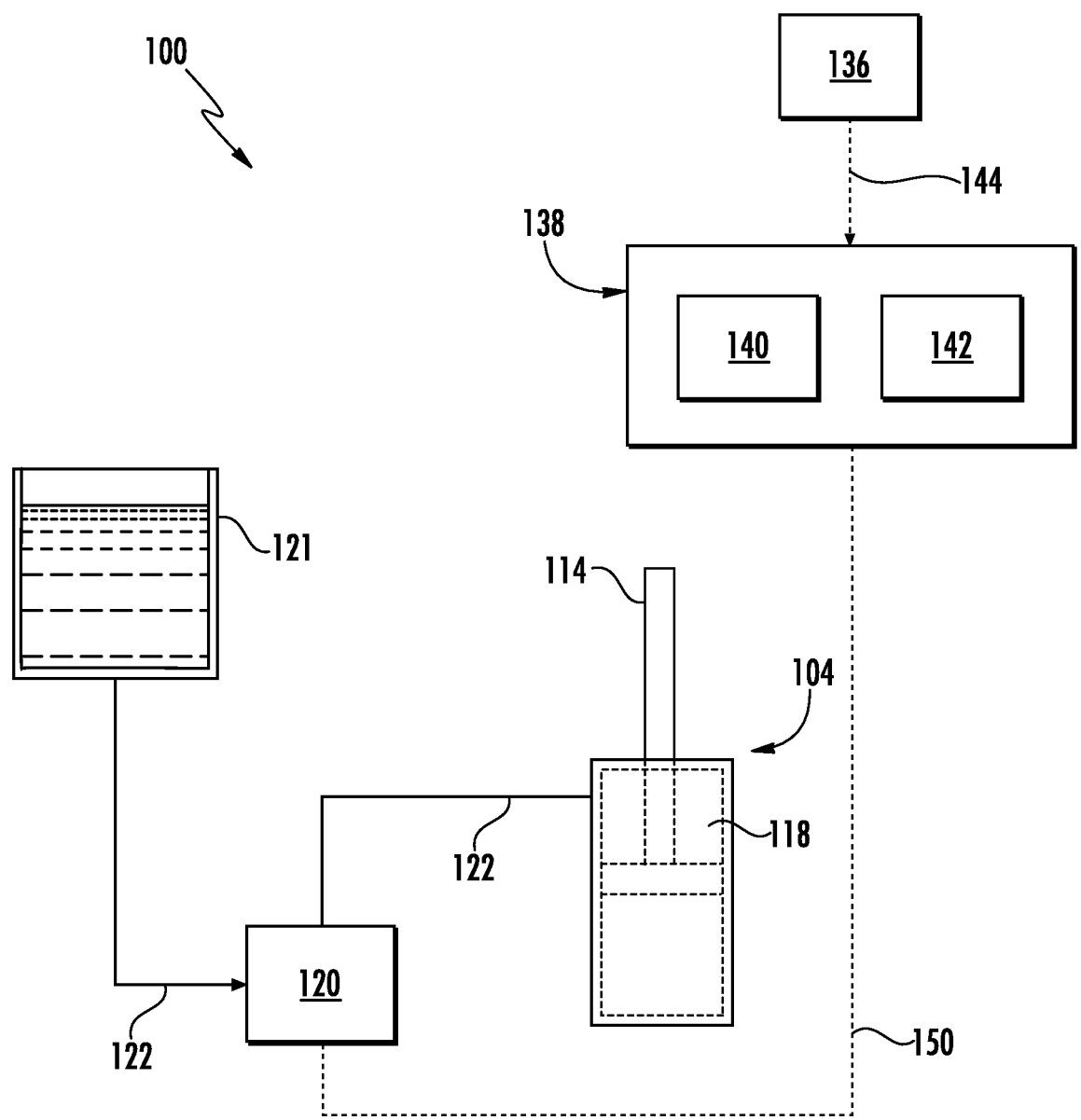
FIG. 7 illustrates a schematic view of another embodiment of a system for adjusting down pressure loads on ground engaging elements of a harrow in accordance with aspects of the present subject matter.

Referring now to FIG. 7, a schematic diagram of a specific implementation of the system 100 described above with reference to FIG. 3 is illustrated in accordance with aspects of the present subject matter. As shown in FIG. 7, the system 100 may include a controller 138 configured to electronically control the operation of one or more of the disclosed system components. In general, the controller 138 may comprise any suitable processor-based device known in the art, such as a computing device or any suitable combination of computing devices. Thus, in several embodiments, the controller 138 may include one or more processor(s) 140 and associated memory device(s) 142 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 142 of the controller 138 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 142 may generally be configured to store suitable computer-readable instructions that, when implemented by the processor(s) 140, configure the controller 138 to perform various computer-implemented functions, such as one or more aspects of the method 200 described below with reference to FIG. 8. In addition, the controller 138 may also include various other suitable components, such as a communications circuit or module, one or more input/output channels, a data/control bus and/or the like.

It should be appreciated that the controller 138 may correspond to an existing controller of the work vehicle or the implement 10 or the controller 138 may correspond to a separate processing device. For instance, in one embodiment, the controller 138 may form all or part of a separate plug-in module that may be installed within the work vehicle or implement 10 to allow for the disclosed system and method to be implemented without requiring additional software to be uploaded onto existing control devices of the vehicle or implement 10.

Additionally, the system 100 may also include one or more sensors 136 communicatively coupled to the controller 138. In general, the sensor(s) 136 may be provided in operative association with one or more components of the harrow 26 to allow the sensor(s) 136 to detect an operating parameter associated with the down pressure on the ground engaging elements 28. For example, in several embodiments, the sensor 136 may correspond to a pressure sensor(s) configured to detect or measure a pressure of the fluid supplied within the actuator 104, which may be indicative of the down pressure on the ground engaging elements 28. In this respect, the sensor(s) 136 may be provided in fluid communication with a fluid chamber defined within the actuator 104 (e.g., the piston-side chamber 118 of the actuator 104) or may be provided at any other suitable location defined along the fluid path between the PRV 120 and the actuator 104 (e.g., by being in fluid communication with the fluid conduit 122). Alternatively, the sensor(s) 136 may correspond to a load sensor(s) (e.g., a strain gauge or load cell) configured to directly or indirectly detect or measure the down pressure applied on the ground engaging elements 28. For instance, the sensor(s) 136 may be provided in operative association with one or more of the ground engaging elements 28, the lower support arm 46 and/or any other suitable harrow component(s) that allows the sensor(s) 136 to directly or indirectly detect the down pressure loads. In further embodiments, the sensor(s) 136 may correspond to any other suitable sensor(s) installed at any other suitable location(s) that allows the sensor(s) to detect an operating parameter associated with the down pressure currently being applied on the plurality of ground engaging elements 28.

As indicated above, the controller 138 may be configured to actively adjust the down pressure loads on the ground engaging elements 28 of the harrow 26. Specifically, in several embodiments, the controller 138 may be communicatively coupled to the sensor 136 via a wired or wireless connection to allow measurement signals (e.g., indicated by dashed line 144 in FIG. 7) to be transmitted from the sensor 136 to the controller 138. The controller 138 may then be configured to control the operation of the actuator 104 based on the measurement signals 144 received from the sensor 136 so as to regulate the down pressure applied on the ground engaging elements 28. In doing so, the controller 138 may be configured determine or estimate the down pressure loads on the ground engaging elements 28 based on the signals 144 received from the sensor 136. For instance, the controller 138 may include a look-up table or suitable mathematical formula stored within its memory 142 that correlates the operating parameter measurements to the down pressure loads.

Additionally, in several embodiments, the controller 138 may be configured to monitor the down pressure on the ground engaging elements 28 relative to one or more desired pressure ranges. For instance, upon receiving the signals 144 from the sensor 136, the controller 138 may be configured to compare the monitored down pressure to a predetermined down pressure range defined for the ground engaging elements 28. Thereafter, in the event that the monitored down pressure exceeds a maximum pressure threshold for the given pressure range or falls below a minimum pressure threshold for the given pressure range (thereby indicating that the down pressure on the ground engaging elements 28 may be too high or too low), the controller 138 may be configured to control the operation of the actuator 104 to adjust the down pressure on the ground engaging elements 28. In particular, as described above, the controller 138 may control the operation of the actuator 104 to adjust the relative distance between the lower support arm 46 and the base hitch plate 32 by extending or retracting the actuator rod 114. For instance, the controller 138 may control the operation of the actuator 104 such that the rod 114 is extended when the monitored down pressure exceeds the maximum pressure threshold to reduce the down pressure being applied on the ground engaging elements 28. Similarly, the controller 138 may control the operation of the actuator 104 such that the rod 114 is retracted when the monitored down pressure falls below the minimum pressure threshold to increase the down pressure being applied on the ground-engaging elements 28.

As indicated above, the controller 138 may be configured to control the operation of the actuator 104 by actively controlling the operation of the associated PRV 120. For instance, in the illustrated embodiment, the controller 138 is communicatively coupled to the PRV 120 (e.g., as indicated by dashed line 150) such that the controller 138 may control the operation of the PRV 120 in a manner that regulates the pressure of the hydraulic fluid supplied to the rod-side chamber 118 of the actuator 104. In such an embodiment, the pressure of the fluid supplied from the PRV 122 may be directly proportional to the pressure within the rod-side chamber 118 of the actuator 104, thereby allowing the controller 138 to control the displacement of the actuator 104. It should be appreciated that, in alternate embodiments, the controller 138 may be configured to be coupled to any other suitable component(s) for automatically controlling the operation of the actuator 104.

Figure 8:
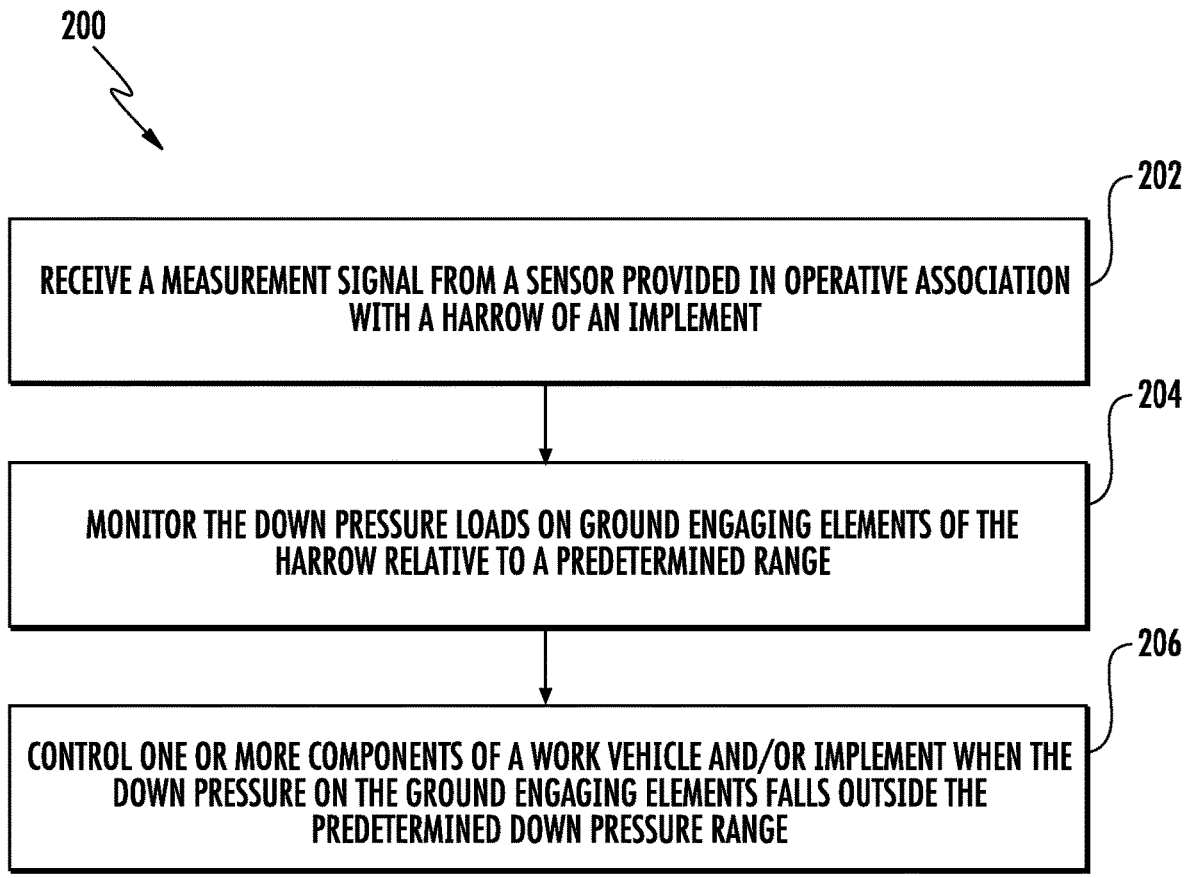
FIG. 8 illustrates a flow diagram of one embodiment of a method for adjusting down pressure loads on ground engaging elements of a harrow in accordance with aspects of the present subject matter.

Referring now to FIG. 8, a flow diagram of one embodiment of a method 200 for adjusting down pressure loads on ground engaging elements of a harrow of an agricultural implement is illustrated in accordance with aspects of the present subject matter. In general, the method 200 will be described herein with reference to the implement 10, the harrow 26, and the system 100 described above with reference to FIGS. 1-7. However, it should be appreciated by those of ordinary skill in the art that the disclosed method 200 may generally be utilized to adjust the down pressure loads on ground engaging elements of any agricultural implement having any suitable implement configuration and/or of any harrow having any suitable harrow configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include receiving a measurement signal from a sensor provided in operative association with a harrow of an implement. For instance, as indicated above, the controller 138 may be communicatively coupled to one or more sensors 136. As such, measurement signals 118 transmitted from the sensor(s) 136 may be received by the controller 138 for subsequent processing of the associated operating parameter measurements.

Additionally, at (204), the method 200 may include monitoring the down pressure loads on the ground engaging elements relative to a predetermined pressure range. Specifically, as indicated above, the controller 138 may be configured to compare the monitored down pressure load to one or more predetermined pressure ranges.

Moreover, as shown in FIG. 8, at (206), the method 200 may include controlling one or more components of the work vehicle and/or implement when the down pressure on the ground engaging elements falls outside the predetermined pressure range. For instance, as indicated above, the controller 138 may, in one embodiment, be configured to control the operation of the actuator 104 (e.g., via the PRV 120) to adjust the relative distance between the base hitch member 32 and the lower support arm 46, thereby adjusting the down pressure loads on the ground engaging elements 28.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for adjusting down pressure loads on a harrow of an agricultural implement, the system comprising:
    a base hitch member;
    an upper tow arm pivotally coupled to the base hitch member;
    first and second linkage arms pivotally coupled to the upper tow arm;
    a lower support arm pivotally coupled to the first and second linkage arms;
    a plurality of ground engaging elements supported on the lower support arm; and
    a tensioner assembly coupled between the base hitch member and the lower support arm, the tensioner assembly including a fluid driven actuator and a linkage bar, the fluid driven actuator including an actuator rod configured to be extended and retracted to adjust a relative distance between the base hitch member and the lower support arm, the linkage bar comprising a rigid member extending lengthwise from a first end coupled to the actuator rod to a second end pivotally coupled to the base hitch member or the lower support arm,
    wherein the fluid driven actuator is configured to be pressurized at a predetermined fluid pressure to set the relative distance between the base hitch member and the lower support arm such that, when a force applied through the fluid driven actuator from the lower support arm exceeds the predetermined fluid pressure, the actuator rod is configured to be actuated to reduce the down pressure applied against the ground engaging elements.

2. The system of claim 1, further comprising:
    a sensor configured to detect an operating parameter associated with the down pressure being applied on the plurality of ground engaging elements;
    a controller communicatively coupled to the sensor, the controller being configured to control an operation of the fluid driven actuator based on measurement signals received from the sensor so as to regulate the down pressure applied on the plurality of ground engaging elements.

3. The system of claim 2, further comprising a valve configured to regulate a supply of fluid being supplied to the fluid driven actuator, the controller being configured to control the operation of the fluid driven actuator by regulating a fluid pressure of the fluid being supplied from the valve to the fluid driven actuator.

4. The system of claim 2, wherein the controller is configured to monitor the down pressure applied on the plurality of ground engaging elements via the measurement signals received from the sensor relative to a maximum down pressure threshold, the controller being configured to control the operation of the fluid driven actuator such that the actuator rod is extended when the monitored down pressure exceeds the maximum down pressure threshold to reduce the down pressure being applied on the ground-engaging elements.

5. The system of claim 2, wherein the controller is configured to monitor the down pressure applied on the plurality of ground engaging elements via the measurement signals received from the sensor relative to a minimum down pressure threshold, the controller being configured to control the operation of the fluid driven actuator such that the actuator rod is retracted when the monitored down pressure exceeds the minimum down pressure threshold to increase the down pressure being applied on the ground-engaging elements.

6. The system of claim 2, wherein the operating parameter comprises a load applied on the ground engaging elements or a fluid pressure of fluid supplied within the fluid driven actuator.

7. The system of claim 1, wherein the first and second linkage arms are coupled between the upper tow arm and the lower support arm so as to form a four bar linkage.

8. The system of claim 1, wherein the plurality of ground engaging elements comprises a plurality of tines.

9. A system for adjusting down pressure loads on a harrow of an agricultural implement, the system comprising:
    a base hitch member;
    a lower support arm configured to move relative to the base hitch member;
    a plurality of ground engaging elements supported on the lower support arm; and
    a tensioner assembly coupled between the base hitch member and the lower support arm, the tensioner assembly including a fluid driven actuator and a separate damper, the fluid driven actuator including an actuator rod configured to be extended and retracted to adjust a relative distance between the base hitch member and the lower support arm, the damper comprising an air cylinder coupled between the actuator rod of the fluid driven actuator and one of the base hitch member or the lower support arm, wherein the fluid driven actuator is configured to regulate a down pressure applied on the plurality of ground engaging elements by adjusting the relative distance between the base hitch member and the lower support arm.

10. The system of claim 9, further comprising:
a sensor configured to detect an operating parameter associated with the down pressure being applied on the plurality of ground engaging elements; and
a controller communicatively coupled to the sensor, the controller being configured to control an operation of the fluid driven actuator based on measurement signals received from the sensor so as to regulate the down pressure applied on the plurality of ground engaging elements.

11. The system of claim 10, further comprising a valve configured to regulate a supply of fluid being supplied to the fluid driven actuator, the controller being configured to control the operation of the fluid driven actuator by regulating a fluid pressure of the fluid being supplied from the valve to the fluid driven actuator.

12. The system of claim 10, wherein the controller is configured to monitor the down pressure applied on the plurality of ground engaging elements via the measurement signals received from the sensor relative to a maximum down pressure threshold, the controller being configured to control the operation of the fluid driven actuator such that the actuator rod is extended when the monitored down pressure exceeds the maximum down pressure threshold to reduce the down pressure being applied on the ground-engaging elements.

13. The system of claim 10, wherein the controller is configured to monitor the down pressure applied on the plurality of ground engaging elements via the measurement signals received from the sensor relative to a minimum down pressure threshold, the controller being configured to control the operation of the fluid driven actuator such that the actuator rod is retracted when the monitored down pressure exceeds the minimum down pressure threshold to increase the down pressure being applied on the ground-engaging elements.

14. The system of claim 10, wherein the operating parameter comprises a load applied on the ground engaging elements or a fluid pressure of fluid supplied within the fluid driven actuator.

15. The system of claim 9, wherein the first and second linkage arms are coupled between the upper tow arm and the lower support arm so as to form a four bar linkage.

16. The system of claim 9, wherein the plurality of ground engaging elements comprises a plurality of tines.

\* \* \* \* \*